United States Patent [19]

Stapleton

[11] Patent Number: 5,657,914

[45] Date of Patent: Aug. 19, 1997

[54] DETACHABLE LOAD BEARING UTILITY RACK

[75] Inventor: Craig A. Stapleton, Troy, Mich.

[73] Assignee: Advanced Accessory Systems LLC, Port Huron, Mich.

[21] Appl. No.: 507,699

[22] Filed: Jul. 26, 1995

[51] Int. Cl.$^6$ .................................................. B60R 9/00
[52] U.S. Cl. .................... 224/319; 224/309; 224/321; 224/322; 224/330; 224/331
[58] Field of Search ............................ 224/309, 319, 224/321, 322, 323, 324, 330, 331, 924, 917

[56] References Cited

U.S. PATENT DOCUMENTS

| | | | |
|---|---|---|---|
| 3,610,491 | 10/1971 | Bott | 224/319 |
| 3,685,061 | 8/1972 | Wray | 224/321 |
| 3,848,785 | 11/1974 | Bott | 224/318 |
| 4,030,647 | 6/1977 | Rasor et al. | 224/309 |
| 4,261,496 | 4/1981 | Mareydt et al. | 224/309 |
| 4,342,411 | 8/1982 | Bott | 224/324 |
| 4,516,709 | 5/1985 | Bott | 224/315 |
| 4,767,041 | 8/1988 | Stapleton | 224/326 |
| 5,135,145 | 8/1992 | Hannes et al. | 224/329 |
| 5,314,104 | 5/1994 | Lee | 224/924 |
| 5,419,479 | 5/1995 | Evels et al. | 224/331 |

FOREIGN PATENT DOCUMENTS

| | | | |
|---|---|---|---|
| 1004722 | 4/1952 | France | 224/319 |
| 3138146 | 4/1983 | Germany | 224/309 |

*Primary Examiner*—Henry J. Recla
*Assistant Examiner*—Timothy L. Maust
*Attorney, Agent, or Firm*—Rader, Fishman & Grauer PLLC

[57] ABSTRACT

A utility rack is provided for attachment to a vehicle luggage carrier. The utility rack includes a utility rail with first and second stanchions secured to the rail. Each stanchion includes an upper bracket and a lower bracket pivotally secured with respect to each other by a pivot joint. Each lower bracket includes a clamp for attachment to a crossbar of the luggage carrier. Each pivot joint includes an adjuster, preferably, a gear tooth interlock between the upper and lower brackets, in order to secure the upper and lower brackets at desired pivotal positions with respect to each other to facilitate attachment to sloping luggage carrier crossbars. Preferably, the utility rail extends laterally beyond the side rails of the luggage carrier to facilitate carrying larger or bulkier loads.

14 Claims, 2 Drawing Sheets

DETACHABLE LOAD BEARING UTILITY RACK

TECHNICAL FIELD

The present invention relates to article carriers for vehicles, and more particularly to a detachable utility rack for attachment to existing vehicle luggage carriers.

BACKGROUND ART

It is commonly known in the automotive industry to provide article carriers on top of vehicles for carrying a variety of items, such as parcels, skis, bicycles, luggage, etc. However, such article carriers are often designed with an emphasis on styling which limits carrying capacity. Accordingly, such luggage racks may not carry heavy or relatively large or bulky loads such as large boxes, ladders, boats, etc.

Presently, no known luggage rack exists which provides an easily attachable utility rail which extends laterally beyond the sides of the luggage rack in order to carry such larger items. Further, no such utility rail exists which provides flexibility for attachment to a variety of existing automotive luggage racks.

DISCLOSURE OF THE INVENTION

The present invention alleviates the above-referenced problems experienced in prior art luggage rack assemblies by providing an easily attachable utility rail which clamps to an existing luggage rack crossbar and includes a pair of pivotable stanchions which allow for attachment to existing crossrails of various angular configurations. Preferably, the utility rail provided extends laterally beyond the sides of an existing luggage rack when attached in order to support larger or bulkier loads.

The present invention provides a luggage carrier having a removably attached utility rack. The luggage carrier includes a pair of side rails secured to the roof of a vehicle with a pair of crossbars extending between the side rails. The utility rack comprises a utility rail with first and second stanchions secured to the utility rail. Each stanchion includes an upper bracket and a lower bracket pivotally secured with respect to each other. Each lower bracket includes a clamp for attachment to the crossbar of the installed luggage carrier.

The present invention also provides a utility rack adapted for attachment to the crossbar of an installed vehicle luggage carrier. The rack comprises a utility rail, and a pair of stanchions preferably formed as upper and lower brackets, the brackets pivotally connected with respect to each other and having interlocking gear-toothed faces. Each upper bracket is secured to the utility rail, and each lower bracket includes a clamp for selective attachment to the crossbar of a vehicle luggage carrier.

The present invention further provides a utility rail adapted for attachment to the crossbar of an installed vehicle luggage carrier. The utility rail includes a pair of upper brackets extending perpendicularly from the rail. A pair of lower brackets are attached to the upper brackets, and include a clamp for attachment to the crossbar. An adjuster pivotally couples each upper bracket to its responsive lower bracket.

Accordingly, an object of the present invention is to provide a vehicle utility rack which is adaptable for attachment to various existing vehicle luggage carriers, and adjusts the load bearing area or load bearing strength of the carrier. Preferably, the rail extends laterally beyond the sides of the existing luggage carrier to support larger or bulkier loads.

A further object of the present invention is to provide a utility rack which includes a rail and a pair of stanchions with upper and lower brackets pivotally secured with respect to each other to allow adjustment for attachment to vehicle luggage carriers of varying configurations.

Yet another object of the present invention is to provide a utility rack which utilizes the existing adjustability of vehicle luggage carrier crossbars.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
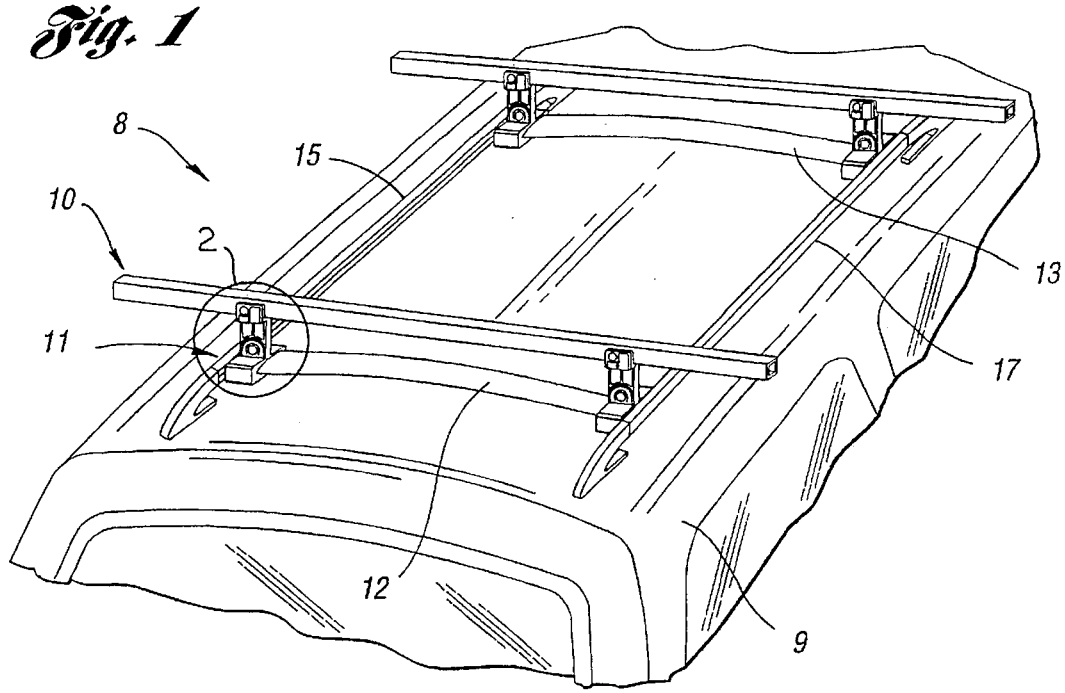
FIG. 1 shows a perspective view of a utility rack secured to an existing vehicle luggage rack in accordance with the present invention.
Figure 2:
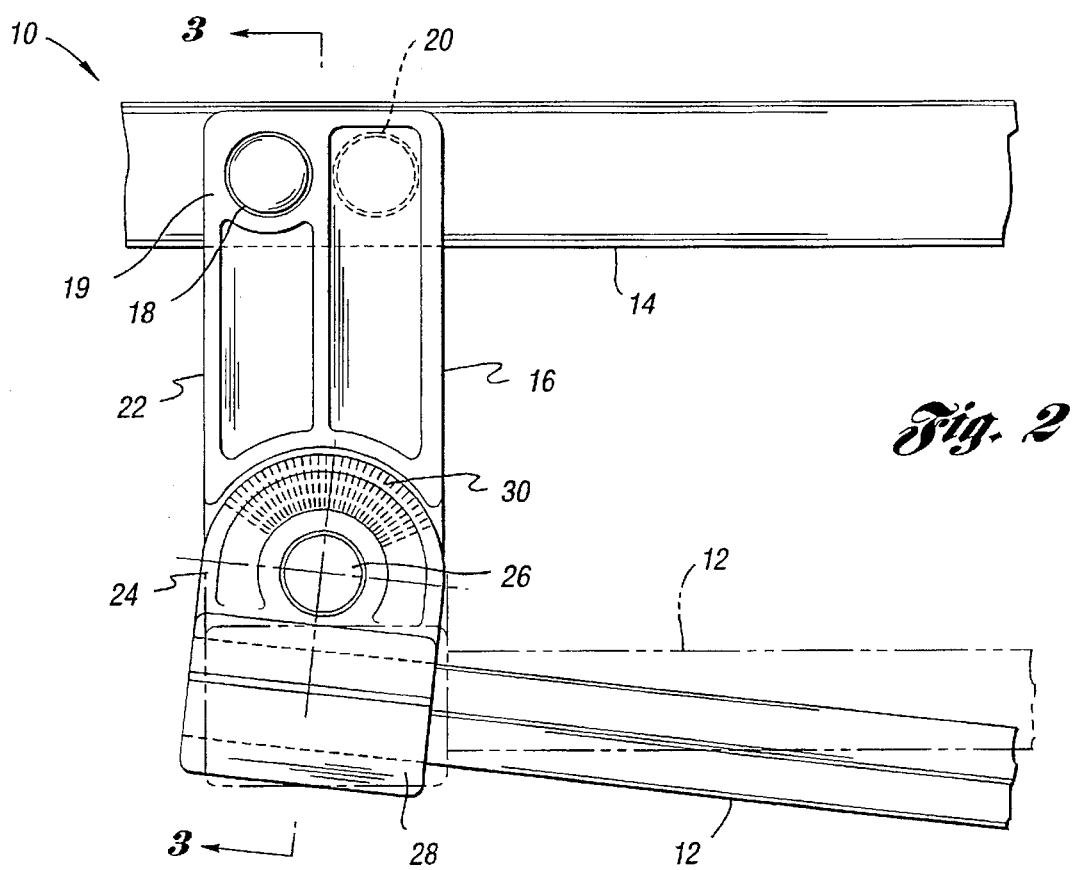
FIG. 2 shows an enlarged view of a portion of the rack of the present invention found substantially within encircled portion 2 of FIG. 1.

FIG. 1 shows an article carrier assembly 8 secured to the top of a vehicle 9. The article carrier assembly 8 includes a utility rack 10 which is removably secured to an existing vehicle luggage carrier 11. The existing vehicle luggage carrier 11 includes a pair of crossbars 12,13 extending between side rails 15,17, which are mounted to the top of the vehicle 9. Typically, the design of such vehicle luggage carriers 11 is significantly influenced by styling and wind noise considerations, thus adversely effecting functional considerations.

Accordingly, in order to provide greater carrying capacity for larger or heavier loads, the utility rack 10 is secured to the existing vehicle luggage carrier 11. The utility rack 10 includes a utility rail 14 with a pair of stanchions 16 extending from the utility rail 14 for attachment to a crossbar 12,13 of the existing vehicle luggage carrier 11. The utility rack 10 reconfigures the load bearing area of the existing luggage carrier 11 to provide additional strength or support area.

The utility rail 14 preferably comprises a cross-sectional configuration of greater structural integrity than that of the existing vehicle luggage carrier crossbars 12,13 for enhanced structural support. The utility rail 14 also preferably extends laterally beyond the side rails 15,17 of the existing luggage carrier 11 in order to support larger loads.

Figure 3:
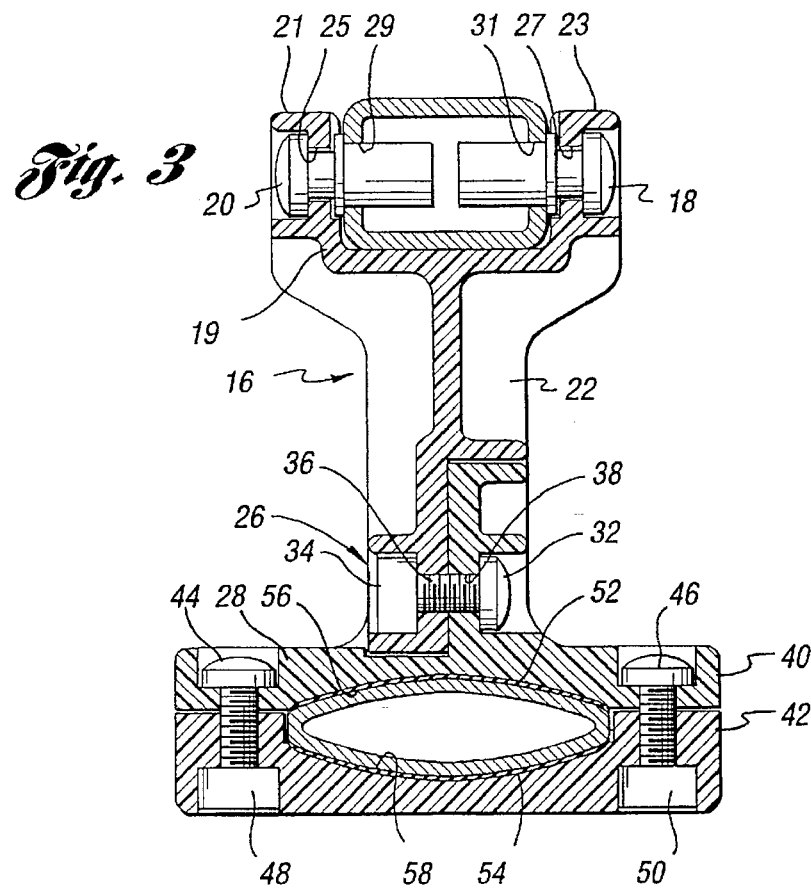
FIG. 3 shows a vertical cross-section of a utility rack and stanchion taken through line 3—3 of FIG. 2.

Each stanchion 16 is attached to the utility rail 14 by a holder 19. The holder 19 preferably includes an offset pair of screws 18,20 which extend from a pair of offset screw housings 21,23 (see FIG. 3) through apertures 25,27 in the screw housings 21,23, and, further, into the utility rail 14 through the apertures 29,31 in the rail. The screws 18,20 are offset to resist pivoting of the stanchion 16 with respect to the utility rail 14.

Each stanchion 16 includes an upper and lower bracket 22,24 respectively. The upper and lower brackets 22,24 are pivotally connected with respect to each other at the pivot joint 26. A bolt 32 extends through apertures 36,38 in the upper and lower brackets 22,24 to engage the nut 32 in order to secure the upper and lower brackets 22,24 with respect to each other. Each lower bracket 24 includes a clamp 28 which selectively attaches the stanchion 16 to an existing vehicle crossrail 12.

The upper and lower brackets 22,24 are pivotally connected at the pivot joint 26 in order to allow for attachment to luggage carrier crossbars 12,13 of varying angles with respect to the utility rail 14 which is generally disposed horizontally. The upper and lower brackets 22,24 include an adjuster 29 in the form of a gear tooth interlock 30 in order to secure the upper and lower brackets 22,24 at a desired angle. The adjuster compensates for alignment and styling configurations.

Figure 4:
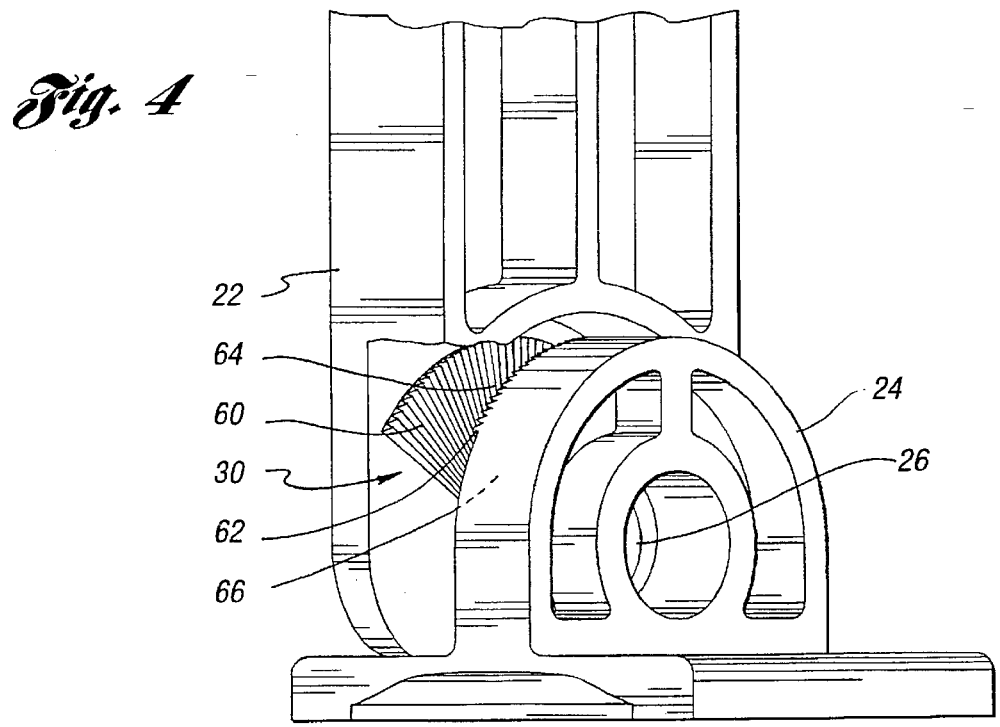
FIG. 4 shows an enlarged exploded perspective view of a pair of upper and lower stanchion brackets shown in FIGS. 2 and 3.

Relative rotation of the upper and lower brackets 22,24 is resisted by the gear tooth interlock 30 (adjuster). FIG. 4 more clearly shows the gear tooth interlock 30. The upper and lower brackets 22,24 include rows of teeth 60,62 extending from inner surfaces 64,66 thereof for interlocking engagement with respect to each other in order to lock the lower bracket 24 at a selected angle with respect to the upper bracket 22.

Returning to FIG. 3, lower bracket 24 includes a clamp 28 having upper and lower portions 40,42. The clamp 28 enables the utility rack to be attached to an existing vehicle luggage rack crossbar. A pair of screws 44,46 and corresponding nuts 48,50 secure the upper clamp portion 40 with respect to the lower clamp portion 42. The upper and lower clamp portions 40,42 include rubber pads 52,54 secured on inner surfaces 56,58 thereof in order to secure, resist vibration, and reduce damage to the surface of existing crossbar 12 when the stanchion 16 is clamped to the crossbar 12.

Of course, the clamp 28 could comprise various configurations to allow attachment of the clamp to various existing vehicle luggage carrier crossbars.

With the stanchions 16 clamped to a crossbar of a vehicle luggage rack, the utility rail extends laterally beyond the sides of the existing luggage rack in order to expand surface area to carry larger or bulkier items. Additionally, the rack configuration and strength provides greater structural integrity than the existing luggage carrier, which may not be particularly sturdy, thereby providing greater support for heavier loads. Also, the positioning of the utility rail 14 above the luggage carrier provides clearance for items such as rear airfoils, thereby allowing longer items to be supported above such interfering items. Further, the adjustment capability of the pivot joint 26 properly orients the clamp 28 to allow for attachment to a sloping crossbar 12 of various angles, thus providing adaptability for attachment to numerous existing luggage carriers.

While the best mode for carrying out the invention has been described in detail, those familiar with the art to which this invention relates will recognize alternative designs and embodiments for practicing the invention. Thus, the above described preferred embodiment is intended to be illustrative of the invention which may be modified within the scope of the following appended claims.

What is claimed is:

1. A utility rack adapted for attachment to the crossbar of an installed luggage carrier, comprising:

a utility rail;

first and second stanchions secured to said utility rail said stanchion including a holder for attachment to the utility rail, means for clamping said stanchion to the crossbar of said installed luggage carrier, and a pivot joint pivotally connecting the holder and the clamp means.

2. The utility rack of claim 1, wherein each said pivot joint comprises an upper and lower bracket having a gear-toothed face for adjustable interlocking engagement with each other.

3. The utility rack of claim 2, wherein the luggage carrier has side rails, and said utility rail extends beyond the side rails of the luggage carrier.

4. The utility rack of claim 2, wherein said clamp comprising first and second portions, each said first and second portion having a rubber pad for engagement with the crossbar.

5. The utility rack of claim 2, wherein said pivot joint comprises a pivot pin through registering apertures in said upper and lower brackets pivotally securing said upper and lower brackets.

6. A utility rack adapted for attachment to the crossbar of an installed vehicle luggage carrier, comprising:

a utility rail; and a pair of upper and lower brackets pivotally connected with respect to each other and having interlocking gear toothed faces, each said upper bracket being secured to said utility rail, and each said lower bracket including a clamp for selective attachment to the crossbar of a vehicle luggage carrier.

7. The utility rack of claim 6, wherein the luggage carrier has side rails, and said utility rail extends beyond the side rails of the luggage carrier.

8. The utility rack of claim 6, wherein said clamp comprising first and second portions, each said first and second portion having a rubber pad for engagement with the crossbar.

9. The utility rack of claim 6, further comprising a pivot pin pivotally securing said upper and lower brackets.

10. A utility rack adapted for attachment to the crossbar of an installed vehicle luggage carrier, comprising:

a utility rail;

a pair of upper brackets extending perpendicularly from said rail;

a pair of lower brackets, each said lower bracket including clamp means for attachment to the crossbar;

a pair of adjusters pivotally coupling said upper and lower brackets.

11. The utility rack of claim 10, wherein each said adjuster comprising a pivot pin pivotally connecting said upper and lower brackets, and gear-toothed mating surfaces formed on each said upper and lower bracket for selectively securing said upper and lower brackets at selected pivoted positions.

12. The utility rack of claim 10, wherein the installed luggage carrier has side rails, and said utility rail extends beyond the side rails of the luggage carrier.

13. The utility rack of claim 10, wherein said clamp comprising first and second portions, each said first and second portion having a rubber pad for engagement with the crossbar.

14. The utility rack of claim 11, further comprising a pivot pin pivotally securing said upper and lower brackets.

* * * * *